Aug. 15, 1961  H. J. THOMAS  2,996,210
SUPPORT STRUT

Filed July 18, 1960  2 Sheets-Sheet 1

INVENTOR.
Herman J. Thomas
BY Herbert Furman
ATTORNEY

Aug. 15, 1961 H. J. THOMAS 2,996,210
SUPPORT STRUT
Filed July 18, 1960 2 Sheets-Sheet 2

INVENTOR.
Herman J. Thomas
BY
Herbert Furman
ATTORNEY

United States Patent Office 2,996,210
Patented Aug. 15, 1961

2,996,210
SUPPORT STRUT
Herman J. Thomas, Roseville, Mich., assignor to General Motors Corporation, Detroit, Mich., a corporation of Delaware
Filed July 18, 1960, Ser. No. 43,665
6 Claims. (Cl. 217—60)

This invention relates to a support strut and more particularly to a support strut for movable vehicle closures.

The support strut of this invention is particularly useful for vehicle station wagon body tail gates which are swingable between open and closed positions. The subject strut allows the operator to move the tail gate between open and closed positions without having to release or engage any latch means to fold or unfold the support strut as is often required in present day constructions.

In the preferred embodiment of the invention, the support strut includes three support members. Two of these support members are slidable relative to each other between extended and retracted positions, with one support member being pivoted adjacent one end thereof to the body by a universal joint type of connection. Latch means are provided to automatically hold these two support members in extended position upon movement of the closure to an open position or to automatically release the members and allow movement thereof to retracted position when the closure is moved to a closed position. The other or second support member of the slidable pair is pivoted adjacent one end thereof to the third support member, the opposite end of which is pivoted to the closure by another universal joint type of connection whereby the entire support strut can both swing and pivot relative to the body and the closure. The third support member is provided with stop means engageable with the second support member to locate these members in aligned relationship and permit only one-way folding and unfolding movement of the third support member relative to the first and second members. Latch means are further provided adjacent the pivot of the second and third support members to hold these members in aligned relationship, with the latch means being automatically engaged upon opening movement of the closure and alignment of the members and being automatically disengaged by engagement of the first support member therewith when the first and second support members have been moved to a retracted position upon closing movement of the closure. Thus, the subject strut is automatically extended and aligned upon movement of the closure to an open position and is automatically retracted and folded upon movement of the closure to a closed position without requiring the operator to release or engage one or more latch means provided on the support strut.

The primary object of this invention is to provide a new and improved support strut. Another object of this invention is to provide a new and improved support strut for vehicle closures movable between open and closed positions, with the support strut being pivotally interconnected between the closure and the body and acting to hold the closure in an open position. A further object of this invention is to provide a new and improved support strut for swingable vehicle closures which allows the operator to move the closure between open and closed positions without having to release or engage any latch means in order to fold and unfold the support strut upon movement of the closure between open and closed positions.

These and other objects of this invention will be readily apparent from the following specification and drawings wherein.

Figure 1:
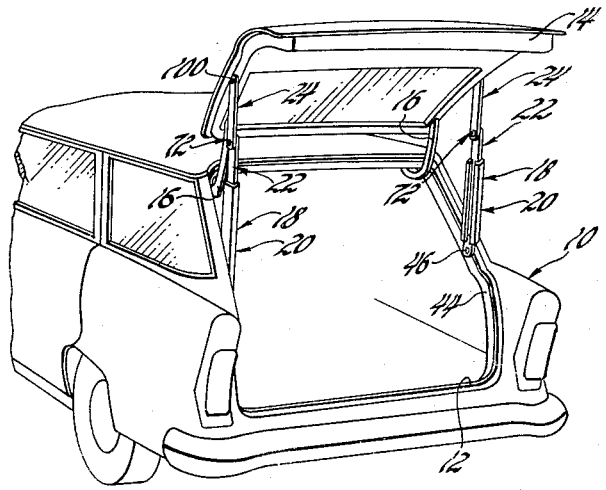
FIGURE 1 is a partial rear perspective view of a station wagon type of body having a swingable tail gate and embodying a support strut according to this invention.

Referring now particularly to FIGURE 1 of the drawing, a station wagon type of vehicle body 10 includes a rear open 12 which is opened and closed by a tail gate 14 suitably mounted on the body 10 by a pair of spaced hinges 16. In order to hold the tail gate 14 in open position, as shown, a pair of spaced like struts 18 are provided at each side of the tail gate. Each strut 18 is of like construction, although of different band, and accordingly only the right-hand strut will be particularly described so it will be understood tht the left-hand strut is the same. It will be further understood, of course, that in certain installations, only one such strut 18 may be provided rather than the two shown in this figure of the drawings.

Strut 18 consists of three support members, a lower or first channel-shaped support member 20 which is pivoted adjacent the lower end thereof to the body 10, as will be described, an intermediate or second support member 22 which is slidable relative to the member 20 between extended and retracted positions relative thereto, and an upper or third support member 24 which is pivoted adjacent one end thereof to the upper end of the member 22 and adjacent the other end thereof to the tail gate 14.

Figures 2, 3:
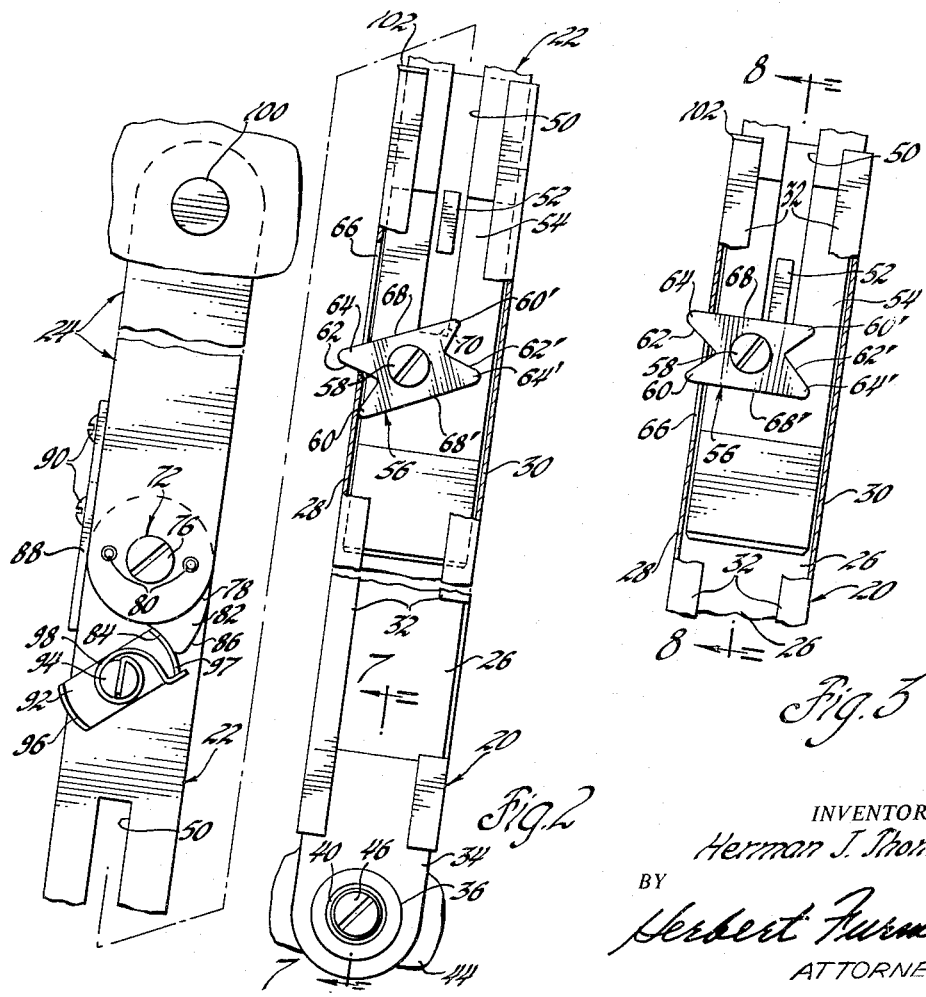
FIGURE 2 is an enlarged view of portions of the right-hand strut shown in FIGURE 1.
FIGURE 3 is a view of a portion of FIGURE 2.
Figure 7:
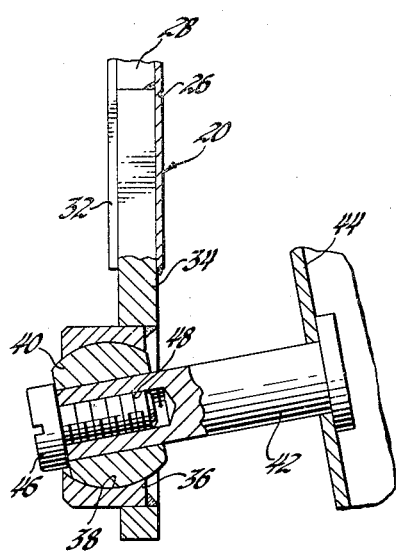
FIGURE 7 is an enlarged sectional view taken generally along the plane indicated by line 7—7 of FIGURE 2.

Member 20 is of channel-shaped cross section as best shown in FIGURES 2, 3, and 7 of the drawings, including a base wall 26 and opposite side walls 28 and 30 which terminate in laterally inwardly extending flanges 32. The lower end of member 20 is reinforced by an apertured member 34, FIGURES 2 and 7, which fits within member 20 and is welded thereto. A bearing block 36 fits within the aperture of member 34 and is welded thereto. Block 36 is provided with a spherical bearing seat 38 which receives an apertured spherical bearing member 40. A headed stud 42 fixedly secured to the pillar wall 44 of the body is received within the aperture of the member 40 and is secured thereto by a stud 46 received within a threaded bore 48 in the split end of stud 42. Thus, the lower end of the member 20 is mounted on the body 10 by a universal joint type of connection so that member 20 can both pivot and rotate relative to the body.

Figure 4:
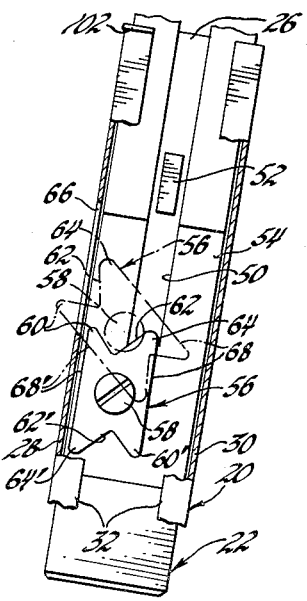
FIGURE 4 is a view similar to FIGURE 3.
Figure 8:
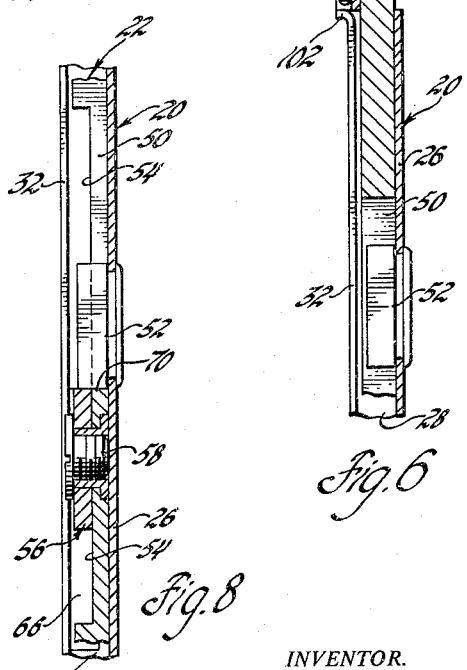
FIGURE 8 is an enlarged sectional view taken generally along the plane indicated by line 8—8 of FIGURE 3.

The member 22 is slidably received within member 20 and is provided with a closed slot 50 intermediate the ends thereof which receives a lug 52 secured to the base 26 of member 20, FIGURE 8. Adjacent the lower end thereof, member 22 includes a portion 54 of reduced thickness, and a star type cam 56 is pivotally secured at 58 to the member 22 within the portion 54 whereby the combined thickness of the cam and of the portion 54 are approximately equal to the thickness of the remainder of member 22, whereby the cam can move with member 22 within member 20. Cam 56 provides the locking means for locking member 22 in an extended position relative to member 20 upon opening movement of tail gate 14 and for releasing member 22 from member 20 upon closing movement of tail gate 14, as will now be described with reference to FIGURES 2, 3 and 4 of the drawings.

When the tail gate 14 is in open position and the members 20 and 22 are in extended position as shown in FIGURE 2, one leg 60 of cam 56 engages the inner surface of wall 28 of member 20 while the edge 62 of the adjacent leg 64 engages the lower end of a slot 66 provided in the wall 28 to prevent any movement of the member 22 to retracted position within member 20. If it is desired to move tail gate 14 to closed position and move members 20 and 22 to a retracted position, the tail gate 14 is moved slightly beyond open position to shift member 22 slightly upwardly or outwardly of member 20 so that the side edge 68 of cam 56 engages lug 52 to rotate cam 56 to its position shown in FIGURE 3 wherein both legs 60 and 64 of the cam project outwardly through the slot 66 as edge 68 engages both lug 52 and the upper end of slot 66 and the lug simultaneously engages the lower end 70 of slot 50. Thereafter, if the tail gate 14 is moved toward closed position, member 22 will move inwardly of member 20, or downwardly as viewed in FIGURES 3 and 4, and the engagement of the edge 68' of the cam with the lower end of the slot 66 will rotate the cam from its position of FIGURE 3 through its dotted line position of FIGURE 4 and thence to its full line position of FIGURE 4 wherein the cam is located within the portion 54 of member 22 so that the member 22 can move within the member 20 to retracted position relative thereto.

Figure 5:
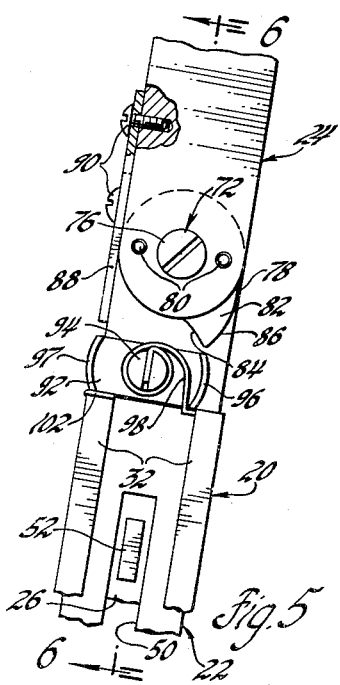
FIGURE 5 is a view of a portion of FIGURE 2.
Figure 6:
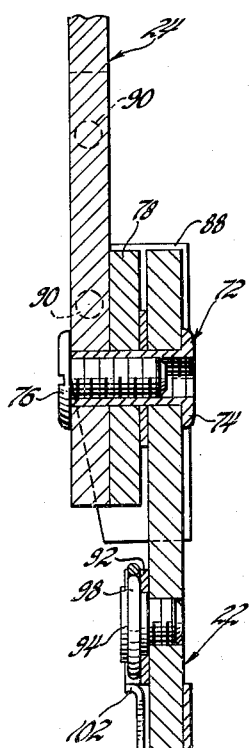
FIGURE 6 is an enlarged sectional view taken generally along the plane indicated by line 6—6 of FIGURE 5.

The upper end of the member 22 is pivoted at 72, FIGURES 2, 5 and 6, to the lower end of member 24, with pivot 72 including an internally threaded bushing 74 which receives a headed stud 76. A latch striker 78 located intermediate members 22 and 24 is secured at 80 to member 24 so as to rotate therewith relative to the member 22. Striker 78 includes a radially extending lug or foot 82 having arcuate edges 84 and 86. A stop plate 88 is secured at 90 to one of the side edges of the member 24, with plate 88 engaging the side edge of the member 22 when the members 22 and 24 are in aligned position to locate the members in this position and permit only one-way pivotal movement of the member 24 relative to the member 22. A latch bolt 92 is rotatably mounted on a pivot stud 94 secured to the member 22 adjacent the upper end thereof as shown in FIGURES 5 and 6. Bolt 92 includes opposite arcuate flanges 96 and 97, with the bolt being continually biased towards a latched position or counterclockwise as viewed in FIGURE 5 by a coil spring 98 having one end secured to the head of the bolt 94 and the other end engaging flange 96. The upper end of the member 24 is pivoted at 100 to a side edge of the tail gate 14. The pivotal connection 100 is the same as the previously described pivotal connection between the lower end of the member 20 and the body, except that no member 34 is required since the member 24 is of larger gauge material than member 20.

When the tail gate 14 is in an open position as shown in FIGURE 1, the support members 20, 22, 24 will be in an extended and aligned relationship with respect to each other. The cam 56 will be in engagement with the lower end of the slot 66 and the inner surface of the wall 28, as shown in FIGURE 2, in order to hold the members 20 and 22 in extended position with respect to each other. The latch bolt 92 will be in its position as shown in FIGURE 2 under the action of the spring 98 so that the flange 96 thereof engages the edge 84 of striker 78 to hold the stop plate 88 in engagement with the side edge of member 22 and thereby locate and hold the members 22 and 24 in aligned relationship.

If the operator now desires to move the tail gate 14 to its closed position, he will first lift up the tail gate 14 or move it slightly beyond open position and then move it toward closed position in order to release cam 56, as previously described, and move or shift members 22 and 24 downwardly of the body as a unit as member 22 moves within member 20 to retracted position. When the members 22 and 24 have been moved to their retracted position relative to each other, the upper flared end 102 of one flange 32 of member 20 will come into engagement with the flange 97 of bolt 92 to rotate the bolt clockwise from its position of FIGURE 2 to its position of FIGURE 5 to move the flange 96 out of engagement with the edge 84 and thereby allow the member 24 to pivot clockwise about the pivot 72 and fold relative to the members 20 and 22 as the tail gate moves to its fully closed position. Since the body pillar walls 44 defining the sides of the opening 12 may not be vertically straight, the strut 18 can both pivot and rotate relative to the tail gate and to the body about the universal joint type connections between the member 20 and the body and the member 24 and the tail gate to compensate for this condition. When the strut 18 is in a retracted and folded position, it will fit within the space between the side edge of the tail gate and the adjacent body pillar wall 44.

When the tail gate 14 is moved to an open position, initial opening movement of the tail gate will swing member 24 upwardly or counterclockwise about pivot 72 relative to the members 20 and 22 so that the member 24 will move to its position as shown in FIGURE 5 wherein the stop plate 88 engages the side edge of the member 22. Upon continued opening movement of the tail gate 14, the members 22 and 24 will move upwardly and outwardly of the member 20 as member 22 moves towards extended position. Initial upward and outward movement of the members 22 and 24 relative to member 20 moves the flared edge 102 of member 20 out of engagement with the latch bolt 92 to allow this bolt to move to latched position with respect to the striker 78 as shown in FIGURE 2. Upon further continued opening movement of the tail gate to an open position slightly beyond its open position of FIGURE 1, upward movement of the members 22 and 24 relative to the member 20 will cause the lug 52 to engage the lower end of slot 50 as the edge 62 of cam 56 engages lug 52 to rotate the cam 56 clockwise from its full line position of FIGURE 4 to a diagonally located position wherein leg 64 projects outwardly of slot 66. The operator thereupon slightly lowers the tail gate 14 or moves it toward closed position so that the edge 62' of cam 56 engages the lower edge of the slot 66 to rotate the cam clockwise to its position as shown in FIGURE 2 wherein leg 60' locks the members 20 and 22 in their extended position.

From the foregoing description it can be seen that this invention provides a support strut which is particularly useful for swingable vehicle closures and allows the closure to be moved between open and closed positions without requiring the operator to either release or engage any latch means to either fold or unfold the support strut.

I claim:

1. In a vehicle body having a closure swingably mounted thereon for movement between open and closed positions, a support strut for holding said closure in open position comprising, in combination, a pair of first and second support members, means interconnecting said members for longitudinal movement of said second member relative to said first member between extended and retracted positions upon opening and closing movement of said closure, first means holding said first and second members in said extended position thereof, a third support member pivoted to said second support member for folding and unfolding movement relative thereto upon opening and closing movement of said closure, means locating said second and third members in an aligned unfolded position upon opening movement of said closure, second means holding said second and third members in said aligned position, means for releasing said first holding means to permit movement of said closure to a closed position and movement of said first and second members to said retracted position thereof, means operative upon movement of said first and second members to said retracted position to release said second holding means and permit folding movement of said third member relative to said first and second members, and means connecting said strut to said closure and to said body.

2. In a vehicle body having a closure swingably mounted thereon for movement between open and closed positions, a support strut for holding said closure in open position comprising, in combination, a pair of first and second support members, means interconnecting said members for longitudinal movement of said second member relative to said first member between extended and retracted positions upon opening and closing movement of said closure, first means holding said first and second members in said extended position thereof, a third support member pivoted to said second support member for folding and unfolding movement relative thereto upon opening and closing movement of said closure, means locating said second and third members in an aligned unfolded position upon opening movement of said closure, second means holding said second and third members in said aligned position, means for releasing said first holding means to permit movement of said closure to a closed position and movement of said first and second members to said retracted position thereof, means on said first member engageable with said second holding means upon movement of said first and second members to said retracted position to release said second holding means and permit folding movement of said third member relative to said first and second members, and means connecting said strut to said closure and to said body.

3. In a vehicle body having a closure swingably mounted thereon for movement between open and closed positions, a support strut for holding said closure in open position comprising, in combination, a pair of first and second support members, means interconnecting said members for longitudinal movement of said second member relative to said first member between extended and retracted positions upon opening and closing movement of said closure, first latch means holding said first and second members in said extended position thereof, a third support member pivoted to said second support member for folding and unfolding movement relative thereto upon opening and closing movement of said closure, means locating said second and third members in an aligned unfolded position upon opening movement of said closure, second latch means holding said second and third members in said aligned position, means for releasing said first latch means to permit movement of said closure to a closed position and movement of said first and second members to said retracted position thereof, means on said first member engageable with said second latch means upon movement of said first and second members to said retracted position to release said second latch means and permit folding movement of said third member relative to said first and second members, and means connecting said strut to said closure and to said body.

4. In a vehicle body having a closure swingably mounted thereon for movement between open and closed positions, a support strut for holding said closure in open position comprising, in combination, a pair of first and second support members, means interconnecting said members for longitudinal movement of said second member relative to said first member between extended and retracted positions upon opening and closing movement of said closure, first latch means for holding said first and second members in said extended position thereof, a third support member pivoted to said second support member for folding and unfolding movement relative thereto upon opening and closing movement of said closure, means locating said second and third members in an aligned unfolded position upon opening movement of said closure, second latch means for holding said second and third members in said aligned position, means on said second member for releasing said first latch means to permit movement of said closure to a closed position and movement of said first and second members to said retracted position thereof, means on said first member engageable with said second latch means upon movement of said first and second members to said retracted position to release said second latch means and permit folding movement of said third member relative to said first and second members, and means connecting said strut to said closure and to said body.

5. In a vehicle body having a closure swingably mounted thereon for movement to open and closed positions, a support strut for holding said closure in open position comprising, in combination, first and second support members, means interconnecting said members for movement of said first member relative to said second member between extended and retracted positions upon opening and closing movement of said closure, a third support member pivoted to said second support member for folding and unfolding movement relative thereto upon opening and closing movement of said closure, first latch means for holding said first and second members in said extended position thereof upon movement of said closure to an open position, stop means on said third member engageable with said second member to locate said members in an aligned unfolded position upon opening movement of said closure, second latch means for holding said stop means in engagement with said second member to thereby hold said second and third members in said aligned position, means for releasing said first latch means upon movement of said closure to a closed position to allow said first and second members to move to said retracted position thereof, means on said first member engageable with said second latch means upon movement of said first and second members to retracted position to release said second latch means and allow folding movement of said third member relative to said first and second members, and means pivotally connecting said strut to said closure and body.

6. In a vehicle body having a closure swingably mounted thereon for movement to open and closed positions, a support strut for holding said closure in open position comprising, in combination, first and second support members, means interconnecting said members for movement of said first member relative to said second member between extended and retracted positions upon opening and closing movement of said closure, a third support member pivoted to said second support member for folding and unfolding movement relative thereto upon opening and closing movement of said closure, first latch means for holding said first and second members in said extended position thereof upon movement of said closure to an open position, means on said third member engageable with said second member to locate said members in an aligned unfolded position upon opening movement of said closure, second latch means on said second member engageable with said third member for holding said stop means in engagement with said second member to thereby hold said second and third members in said aligned position, biasing means biasing said second latch means to latched position, means for releasing said first latch means upon movement of said closure to a closed position to allow said first and second members to move to said retracted position thereof, means on said first member engageable with said second latch means upon movement of said first and second members to retracted position to move said second latch means to unlatched position out of engagement with said third member and allow folding movement of said third member relative to said first and second members, and means pivotally connecting said strut to said closure and body.

No references cited.